United States Patent
Jain

(10) Patent No.: US 10,489,758 B2
(45) Date of Patent: Nov. 26, 2019

(54) ENTERPRISE RESOURCE PLANNING (ERP) INTEGRATOR SYSTEM AND METHOD

(75) Inventor: Manish Jain, Fairfield, CT (US)

(73) Assignee: Citibank, N.A., New York, NY (US)

( * ) Notice: Subject to any disclaimer, the term of this patent is extended or adjusted under 35 U.S.C. 154(b) by 414 days.

(21) Appl. No.: 13/032,722

(22) Filed: Feb. 23, 2011
(Under 37 CFR 1.47)

(65) Prior Publication Data
US 2012/0215687 A1  Aug. 23, 2012

(51) Int. Cl.
*G06Q 20/10* (2012.01)

(52) U.S. Cl.
CPC .................... *G06Q 20/10* (2013.01)

(58) Field of Classification Search
USPC ...................................................... 705/36–38
See application file for complete search history.

(56) References Cited

U.S. PATENT DOCUMENTS

| | | | | |
|---|---|---|---|---|
| 6,021,397 A * | 2/2000 | Jones et al. | | 705/36 R |
| 9,141,713 B1 * | 9/2015 | Narin | | G06F 16/84 |
| 2001/0042785 A1 * | 11/2001 | Walker et al. | | 235/379 |
| 2004/0083426 A1 * | 4/2004 | Sahu | | 715/505 |
| 2004/0117302 A1 * | 6/2004 | Weichert et al. | | 705/40 |
| 2007/0219871 A1 * | 9/2007 | Rolf | | G06Q 30/02 705/14.4 |
| 2007/0282743 A1 * | 12/2007 | Lovelett | | G06Q 20/10 705/40 |
| 2009/0089696 A1 * | 4/2009 | Miller | | G06F 17/2247 715/771 |
| 2010/0211422 A1 | 8/2010 | Zanzot et al. | | |

OTHER PUBLICATIONS

Diaz et al., Inter-Organizational Document Exchange—Facing the Conversion Problem with XML--, ACM 2002, pp. 1043-1047.*
European Search Report dated May 9, 2012 in related Application No. EP 12156725, 7 pages.
Pendyala et al., An XML based framework for enterprise application integration, E-Commerce, 2003, CEC 2003, IEEEE, 2003, 8 pages.
European Communication dated Feb. 21, 2014, corresponding to European Patent Application No. 12156725.9, 7 pages.

* cited by examiner

*Primary Examiner* — Olabode Akintola
(74) *Attorney, Agent, or Firm* — Eric L. Sophir; Dentons US LLP

(57) ABSTRACT

The methods and systems described herein attempt to resolve the deficiencies of the conventional systems by using pre-loaded templates and extracting comprehensively populated payment files in an industry standard format for processing. In one embodiment, a computer-implemented method for generating a payment file comprises receiving, by a computer, a request for a payment to a beneficiary; receiving, by a computer, a selection of the beneficiary for payment; receiving, by a computer, a request to pay the beneficiary using a template; retrieving, by a computer, the template from a database, wherein the template has a plurality of business rules for completing a plurality of data fields; extracting, by a computer, information from a database to complete the data fields of the template; and generating, by a computer, a payment file by completing the data fields of the template according to the plurality of business rules.

20 Claims, 2 Drawing Sheets

ENTERPRISE RESOURCE PLANNING (ERP) INTEGRATOR SYSTEM AND METHOD

FIELD OF THE INVENTION

The present application relates generally to methods and systems for using a template and extracting information to generate a comprehensively populated payment file in an industry standard format.

BACKGROUND

Many corporations send payment instructions to their banks to debit an account for paying beneficiaries that can be located across the world and using different currencies. Some corporations may write checks and mail those checks to the beneficiaries. Other corporations may send payment instructions using online banking systems. Some large corporations will generate a file with multiple payments (sometimes hundreds) for beneficiaries that may be in multiple countries and may receive payment in multiple currencies.

Enterprise resource planning (ERP) software can connect the corporation's operations to a bank to assist with the management of internal and external resources. For example, the ERP software can be used to track the ordering of a material, receipt of an invoice, and payment of that invoice. In operation, the corporation's computers provide information to the banks computers regarding payment of these invoices. The banks require specific formats, fields, and impose constraints on those fields for the payment information. When submitting a request for payment to many beneficiaries across the world, the payment information requirements become very complex, involving different formats and different fields.

In order to simplify the complexity of these payments, the ERP software can be reprogrammed, which is very time consuming and expensive. There are some industry standards for formats that can be used by all banks But if a corporation uses more than one bank, the format is likely different for each bank. So the formatting of the payment instructions can be very tedious for a corporation. Also, extracting the data for individual payment instructions for each bank often requires significant investment, time, and effort. In some instances, a corporation may spend three to four months to generate a payment instruction file.

Conventional solutions by banks attempt to facilitate integration with these corporations, but all of the conventional solutions require software to be installed at the corporations' computers. Even solutions by ERP vendors (e.g., SAP, Oracle, and Microsoft) require extensive consultancy resources to complete the installation of software or toolkit solutions. Sierra Atlantic's BankOn attempts to resolve these issues by providing a bank-agnostic approach towards integrating clients with their banks A cloud server receives the standard payment data sent by a corporation's ERP system and enriches it for individual bank processing. BankOn also delivers the file to the corporation's bank.

SUMMARY OF THE INVENTION

The methods and systems described herein attempt to resolve the deficiencies of the conventional systems by using pre-loaded templates and extracting comprehensively populated payment files in an industry standard format for processing.

In one embodiment, a computer-implemented method for generating a payment file comprises receiving, by a computer, a request for a payment to a beneficiary; receiving, by a computer, a request to pay the beneficiary using a template; retrieving, by a computer, the template from a database, wherein the template has a plurality of business rules for completing a plurality of data fields; extracting, by a computer, information from a database to complete the data fields of the template; and generating, by a computer, a payment file by completing the data fields of the template according to the plurality of business rules.

In another embodiment, a enterprise resource planning (ERP) system for generating a payment file comprises a first database for storing payment information about a beneficiary to be paid; a second database for storing information about an invoice from the beneficiary; a third database for storing information about a bank account for making payments to the beneficiary; a fourth database for storing a template of a payment file, wherein the template comprises business rules for completing a plurality of data fields of the template with data from the first database, second database, and third database; and a payment configuration component for generating a payment file using the template of the fourth database and completing the data fields of the template, then sending the payment file to a network gateway for transmission to a bank for processing.

In yet another embodiment, computer-implemented method for generating a payment request in an enterprise resource planning (ERP) system comprises providing, by a computer, a template, wherein the template comprises a plurality of data fields; and a plurality of instructions for the plurality of data fields, wherein a request to generate a payment file using the template causes a computer to perform the instructions in order to complete the data fields by extracting information from one or more databases.

Additional features and advantages of an embodiment will be set forth in the description which follows, and in part will be apparent from the description, or may be learned by practice of the invention. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The preferred embodiments of the present invention are illustrated by way of example and not limited to the following figures.

DETAILED DESCRIPTION

Reference will now be made in detail to the preferred embodiments of the present invention, examples of which are illustrated in the accompanying drawings.

The exemplary embodiments recite that payment instructions are received from a corporation. However, it is intended that any entity can provide payment instructions using an ERP system, and it is not required that the entity be large or small or even incorporated. As a result, the term corporation used in the exemplary embodiments should be construed to include any entity requesting a payment using an ERP system. Also, the actions performed by the corporation in the exemplary embodiments can be performed by a single user or a group of users that are a part of or perform services on behalf of the corporation. The corporation can interact with the ERP system at a workstation, personal computer, server, or other computing device.

The corporation can make various types of payments using the ERP integration system and methods described herein, including ACH/non-urgent payments, direct debits, wires/urgent payments, local instruments, checks, payments via Citi's WorldLink Payment Services, and multi-bank transactions.

Figure 1:
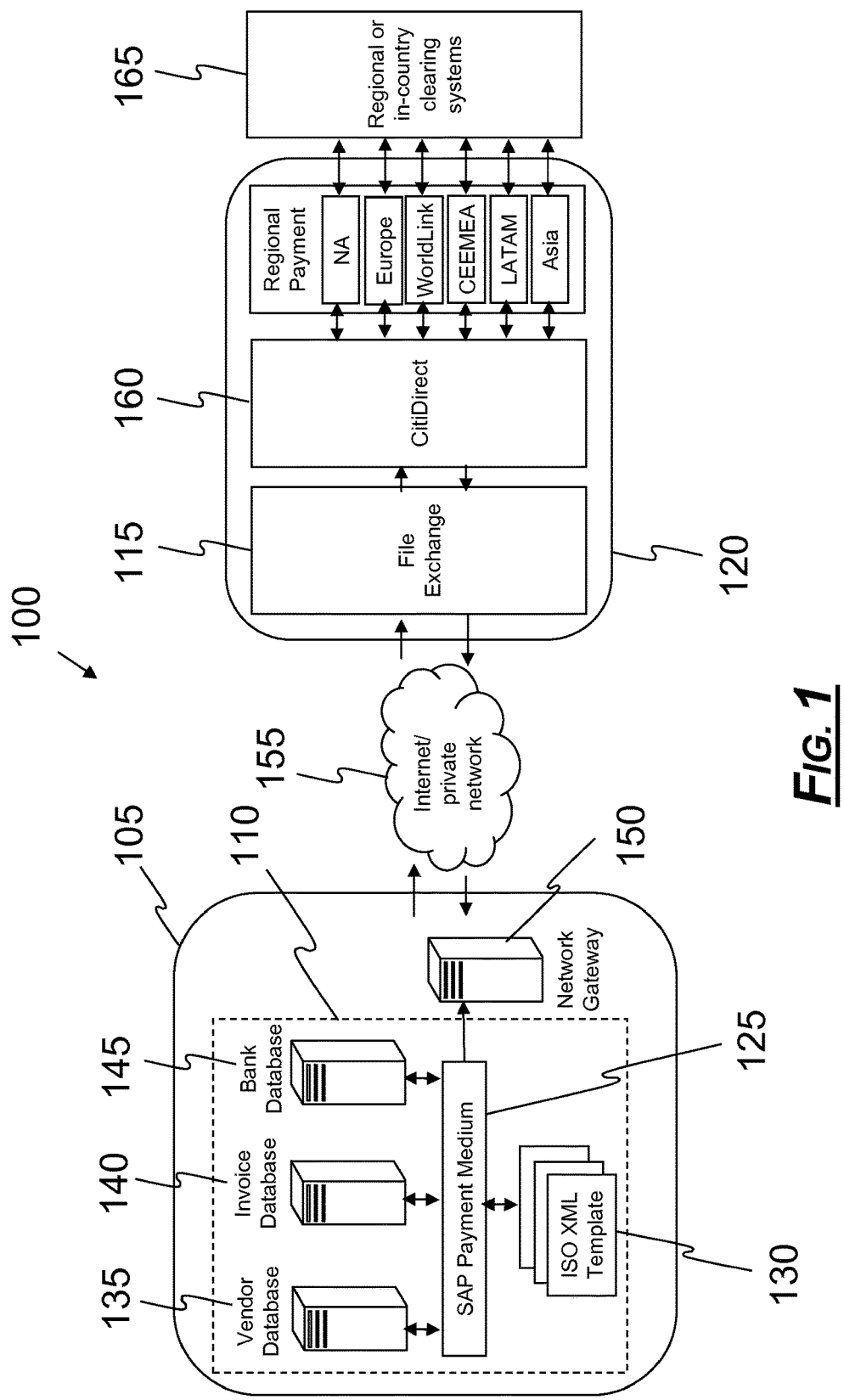
FIG. 1 shows a system overview according to an exemplary embodiment.

Referring to FIG. 1, an exemplary ERP integrator system 100 described herein uses an existing ERP system 105 (e.g., SAP ERP) of a corporation 110 and a file exchange 115 (e.g., Citi File Xchange) of a bank 120. The file exchange 115, such as Citi's File Xchange, is a global gateway for file transmission and translation that effectively integrates payments, receivables, and information with a corporation's accounting, ERP system, and other financial systems. The corporation 110 can use a single delivery channel the file exchange 115 to access the bank's global footprint that includes a wide array of payment instruments across all regions and covering many different currencies.

In this exemplary embodiment, the ERP system 100 is provided by SAP and uses SAP's Payment Medium Workbench 125. The Payment Medium Workbench 125, an integrated software component of SAP's ERP (version 5.7 onwards), is a software tool used to configure and create payment instructions sent by corporations to their banks. In some embodiments, the Payment Medium Workbench 125 may be referred to as a payment configuration component and represents a component that executed by a processor of a computer to select a template, gather the required data, and/or generate a payment file. The Payment Medium Workbench 125 can extract comprehensively populated payment and direct debit files in an industry standard format, such as ISO 20022 XML format. The ISO 20022 standard is a universal financial services messaging scheme that provides the financial industry with a common platform for the develop of messages in a standardized XML syntax.

According to an exemplary method, the bank 120 or other entity can provide the corporation 105 with a template 130 based on the market standard ISO 20022 XML. The template 130 can be provided by e-mail, can be provided on a disk, downloaded from a site, transferred in a host-to-host transfer between ERP systems, or imported in any other known method. The template 130 can be pre-configured with logic to ensure that the required payment details are extracted from an appropriate database, described below. The template 130 is a turnkey solution that does not cause any impact to existing client businesses and operational processes and does not require any new software, licenses, hardware, or utilities to be procured by the corporation. The templates 130 are non-intrusive and leverage existing capabilities within the ERP system 110. The templates 130 are preconfigured to extract all payment details required to be successful in payment initiation. From a typical set of 136 fields in an ERP system, only about 80 get mapped into a standard SAP Idoc file, leaving unaddressed the remaining data fields required. The template 130 has mapping rules (also referred to as business rules or instructions) for all 136 data fields to be in compliance with payment processing across a bank's full global footprint.

Each payment to each country may require a unique payment file. So the template 130 may have some data fields that are required, such as the originating account, the beneficiary's account, and the payment amount. Other fields may be optional. But all of the rules, mandatory or optional, are embedded in the template 130. In one example, for some beneficiaries, the bank of the beneficiary is required to indicate when the payment has arrived. Accordingly, the payment file for those beneficiaries will include contact information for the bank to contact once the payment is received. The template determines which information is necessary for that payment file and instructs the Payment Medium Workbench 125 to extract the data from the database. Some business rules in the template 130 may be directed to formatting, as opposed to completing data fields. The template 130 may also provide a rule that changes currency when the beneficiary is in a location that uses a different currency. The business rules may affect the formatting or inclusion of various data fields, such as ESR subscriber number, account type, control key with bank number, and creditor account.

The templates 130 do not have an executable file that scans the appropriate database. The templates 130 only include instructions for the Payment Medium Workbench 125. The Payment Medium Workbench extracts the information from the database to complete these data fields according to the business rules.

Templates 130 can be used for a variety of transactions. In one exemplary embodiment, two templates are used. A first template is used for credit payments (e.g., wires and checks) and a second template is used for debit payments (e.g., direct debits and electronic mandates). In this example, a corporation may be provided with two global templates: one for credit, one for debit. The template can be configured to be used for any credit (or debit) payment in any country or region of the world. The corporation can modify the template based on the industry, configuration of the ERP system, or the underlying data model.

The corporation can load the template 130 into a the ERP system 110. The template 130 includes instructions for the ERP system 110 regarding the particular layout and design of the ISO 20022 formatted message, including the structure, data fields, and grouping of information. For each data field, the template 130 also includes a business rule. The Payment Medium Workbench 125, along with its existing functions and capabilities, can access the template 130 and execute its business rules.

The template 130 may instruct the ERP system 110 to extract information from a database to complete the data field. One or more databases include data that can be extracted by the Payment Medium Workbench 125 to populate the necessary fields of a template to generate a payment file. The one or more databases can be located at the corporation, the bank, a vendor, or other location. Exemplary databases include a vendor database 135, an invoice database 140, and a bank database 145. For example, for the data field of an originating account number, the business rule instructs the ERP system 110 to go the bank database 145 and retrieve the appropriate account number. In another example, for the data field of a beneficiary's name, the business rule instructs the ERP system 110 to go to the vendor database 135 to get the name, address, and account for the vendor to be paid.

A vendor database 135 stores information such as the contact information of a vendor, account information for a vendor, and any other conditions for that vendor (e.g., an additional approval is required for payment). When extracting data to populate the template 130, the Payment Medium Workbench 125 will retrieve the necessary information regarding the vendor from the vendor database 135.

An invoice database 140 can include information such as the invoice to be paid, products or services rendered in that invoice, or other invoice identifying information. When building a payment file, the Payment Medium Workbench 125 can extract data from the invoice database 140 to indicate which invoice is being paid and include the appropriate amount of the payment.

A bank database 145 can store information about the corporation's banks and their accounts at those banks. The bank database 145 can also provide information regarding which payments should be designated to a particular account at a bank. The Payment Medium Workbench 125 will extract data from the bank database 145 regarding which account should be debited.

Once the templates 130 have been provided to the corporation, the templates 130 can be integrated into the ERP system 110 and the corporation's invoice and payment process business flow can remain substantially unchanged. The corporation 105 can assign the template 130 as an available payment method. The corporation 105 now has the option to use the template 130 to create a comprehensively populated file that can be processed directly by the bank's file exchange 115.

Once the templates are installed in the ERP system 110, the corporation 105 can use the templates 130 to generate payment files. An accounting department of the corporation 105 receives an invoice and decides that the invoice should be paid. The corporation 105 will review the invoice and check it against a purchase order. The invoice is then approved for payment in the ERP system 110.

The corporation 105 selects all or a subset of the invoices to be paid. Typically, these invoices are selected based on the due date. The selected invoices are grouped together for a payment batch to be executed by the ERP system 100. The generation of the payment batch initiates the process of the payment instructions.

The total payment amount is determined for the entire payment batch. When the corporation 105 confirms that funding has been secured for these payments, then batch is to be processed for payment. The corporation 105 loads the batch payments into the ERP system 110 and may modify any mapping rules so that the ERP system 110 can match the information needed for these payments. The corporation 105 is presented with options for payment (e.g., SAP iDoc file) and can select the template 130 as a basis for generating the payment file.

The corporation 105 associates the payments with an account and requests the payment through the ERP system 110. The request triggers the ERP system 110 to extract payment details and construct an ISO 20022 payment file and automatically populate the payment file with the requisite data using the associated business rules for formatting payment file and completing the data fields. In one example, a first data field is designated for information about the beneficiary, such as the beneficiary's name and bank account. The ERP system 110 will extract this information from the vendor database 135. If the business rules require that certain invoices are designated for a certain beneficiary account, then the ERP system 110 will implement those rules and choose the appropriate beneficiary account for the payment. In another example, a second data field is designated for the amount of the payment. The ERP system 110 will extract this information from the invoice database 140. If the business rules dictate that the beneficiary is in another country that uses a different currency, then the amount data field will use the currency of the beneficiary. In yet another example, a third data field is designated for the corporation's account to be deducted. The ERP system 110 will extract the information from the bank database 145 in accordance with any business rules. One business rule may require a certain account based on the purchase amount, so the ERP system 110 will extract the appropriate account based upon the business rules.

The Payment Medium Workbench 125 generates the payment file and transmits the payment file to a network gateway 150. The network gateway 150 transmits the payment file via the internet or a private network 155 to the bank's file exchange 115. The file exchange 115 validates and processes the payment information and then sends the payment information to CitiDirect 160, a web-based payment delivery platform, which determines where the payment should be processed and disseminates the payment files for settlement to regional or country-based clearing systems 165.

Figure 2:
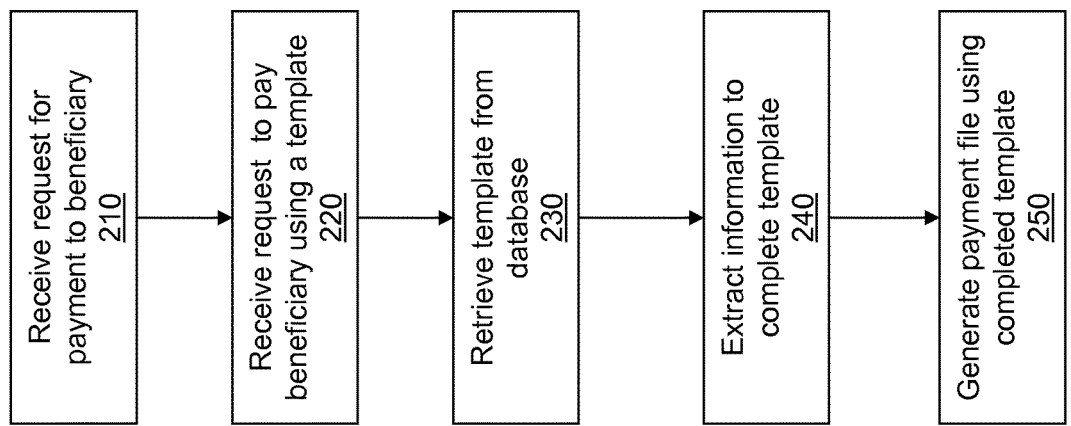
FIG. 2 shows a method for generating a payment file according to an exemplary embodiment.

Referring to FIG. 2, an exemplary process for generating a payment file proceeds as follows. At block 210, the ERP system receives a request from the corporation to pay a beneficiary. At block 220, the ERP system receives a request to pay the beneficiary using a template. At block 230, the ERP system retrieves the template from a database. At block 240, the ERP system extracts information to complete the template in accordance with business rules associated with the data fields for the template. The ERP system can extract information about the beneficiary for completing a first data field in the template, extract information about an invoice for the beneficiary for completing a second data field in the template, and extract information about a bank account for completing a third data field in the template. At block 250, the ERP system generates a payment file using the completed template.

The exemplary ERP system described above and the method of using the same can provide benefits to corporations and banks, including leveraging existing ERP capabilities to extract payment files without additional cost, processing all payment details including local clearing rules by the bank using the standardized format, shortening the implementation process through ERP integration for payments and reconciliation, and more easily adapting to existing ERP customizations. As a result, corporations spend less time configuring their ERP systems to incorporate country-specific formatting guidelines.

In implementing these systems and methods to be performed by a suitably programmed computer, it is intended that the computer have a processor and a computer readable medium, wherein the computer readable medium has program code. The program code can be made of one or more modules that carry out instructions for implementing the systems and methods herein. The processor can execute the instructions as programmed in the modules of the program code.

The systems and methods described can be implemented as a computer program product having a computer readable medium having a computer readable program code embodied therein, the computer readable program code adapted to be executed to implement a method for performing the methods described above. Each step or aspect can be performed by a different module, or a single module can perform more than a single step.

The systems and methods described herein as software can be executed on at least one server, though it is understood that they can be configured in other ways and retain its functionality. The above-described technology can be implemented on known devices such as a personal computer, a special purpose computer, cellular telephone, personal digital assistant (PDA), a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

Moreover, the disclosed methods may be readily implemented in software, e.g., as a computer program product having one or more modules each adapted for one or more functions of the software, executed on a programmed general purpose computer, cellular telephone, PDA, a special purpose computer, a microprocessor, or the like. In these instances, the systems and methods of this invention can be implemented as a program embedded on a personal computer such as a JAVA®, CGI or Perl script, as a resource residing on a server or graphics workstation, as a routine embedded in a dedicated image system, or the like. The systems and methods of this invention can also be implemented by physically incorporating this system and method into a software and/or hardware system, such as the hardware and software systems of a computer. Such computer program products and systems can be distributed and employ a client-server architecture.

The embodiments described above are intended to be exemplary. One skilled in the art recognizes that numerous alternative components and embodiments that may be substituted for the particular examples described herein and still fall within the scope of the invention.

What is claimed is:

1. A computer-implemented method for generating a payment file at a payor computing system containing a payment configuration computer and a network gateway, the payor computing system being remote from a payment facilitation computing system, the method comprising:
   receiving, by the payment configuration computer, a request instructing the payment configuration computer to initiate for a payment to a beneficiary using at least a template file within a plurality of template files previously received from the payment facilitation computing system;
   responsive to receiving the request, automatically identifying, by the payment configuration computer, a single template file from the plurality of template files in a database that is associated with the beneficiary in the request, wherein the identified template file contains a plurality of data fields and logic instructions configured to cause the payment configuration computer to generate the payment file and to modify the plurality of data fields of the identified template file;
   modifying, by the payment configuration computer, the identified template file based on determining which data fields to dynamically select based on the request for the payment, determining which information to extract for the included data fields, and formatting a data field based on the request for the payment according to the logic instructions;
   executing, by the payment configuration computer, an executable file based on the logic instructions in the identified template file to:
      scan and extract, by the payment configuration computer, information from the database to complete the data fields of the modified template file configured for the beneficiary; and
      generate and transmit, by the payment configuration computer via the network gateway to a file exchange server of the payment facilitation computing system, the payment file by completing the data fields of the modified template file according to the logic instructions configured based on the request for the payment, whereby the file exchange server validates the payment file before dissemination.

2. The computer-implemented method according to claim 1, wherein the payment file is in an ISO 20022 XML format.

3. The computer-implemented method according to claim 1, further comprising providing the template file for installation in a database for use in generating the payment file.

4. The computer-implemented method according to claim 1, wherein a first template file is used for generating a credit payment file and a second template file is used for generating a debit payment file.

5. The computer-implemented method according to claim 1, further comprising:
   extracting, by the payment configuration computer, information about the beneficiary for completing a first data field in the template file;
   extracting, by the payment configuration computer, information about an invoice for the beneficiary for completing a second data field in the template file; and
   extracting, by the payment configuration computer, information about a bank account for completing a third data field in the template file.

6. The computer-implemented method according to claim 1, further comprising transmitting the payment file to the file exchange server of a bank for processing.

7. The computer-implemented method according to claim 1, further comprising generating, by an enterprise resource planning system, a batch file of a plurality of payment requests for processing.

8. The computer-implemented method according to claim 1, wherein a first data field of the template file comprises an amount to be paid to the beneficiary, and the payment file is generated by completing the first data field using a preferred currency of the beneficiary.

9. The computer-implemented method according to claim 1, wherein a plurality of business rules determine which data fields are to be completed based upon the beneficiary.

10. The computer-implemented method according to claim 1, further comprising generating a payment file for a beneficiary in a first country and generating a payment file for a second country using the same template file.

11. A enterprise resource planning (ERP) system for generating a payment file at a payor computing system containing a payment configuration computer and network gateway, the payor computing system being remote from a payment facilitation computing system having a file exchange server, the system comprising:
   the payment configuration computer communicatively coupled to:
      a first database for storing payment information about a beneficiary to be paid;
      a second database for storing information about an invoice from the beneficiary;
      a third database for storing information about a bank account for making payments to the beneficiary;
      a fourth database for storing a plurality of template files previously received from the payment facilitation computing system, wherein the each template file contains a plurality of data fields and logic instructions configured to modify the plurality of data fields of the template file based on the beneficiary, and wherein the plurality of data fields of each template file are configured to receive data extracted from the first database, second database, and third database; and
   the payment configuration computer further configured to:
      execute a payment configuration component for automatically selecting a single template file from the plurality of template files based on the beneficiary upon receiving a request to pay the beneficiary,
      modify the identified template file based on determining which data fields to dynamically select based on the request for the payment,
      determine which information to extract for the data fields, and
      format a data field according to the logic instructions of the modified template, and
      generate the payment file using the modified template file of the fourth database by completing the data fields of the modified template file configured for the beneficiary, executing the logic instructions of the template file, and then sending the payment file to the network gateway of the payor computing system for transmission to the file exchange server for processing, whereby the file exchange server validates the payment file before dissemination.

12. The system according to claim 11, wherein the fourth database stores a first template file for credit payments and a second template file for debit payments.

13. The system according to claim 11, wherein the template file comprises instructions for the payment configuration component to complete the data fields.

14. The system according to claim 11, wherein the template file is used by the payment configuration component to generate a payment file for a beneficiary in a first country and a beneficiary in a second country.

15. The system according to claim 11, wherein a first data field of the template file comprises an amount to be paid to the beneficiary, and the payment file is generated by completing the first data field using a preferred currency of the beneficiary.

16. A computer-implemented method for generating a payment file at a payor computing system containing a payment configuration computer and a network gateway, the payor computing system being remote from a payment facilitation computing system, the method comprising:
   selecting, by the payment configuration computer, a template file from a plurality of template files based on a particular beneficiary to receive the payment, wherein the plurality of template files are previously received from the payment facilitation computing system and each template file comprises:
      a plurality of data fields configured for the particular beneficiary; and
      a plurality of instructions for the plurality of data fields,
   wherein a request to generate the payment file using the template file causes a computer to automatically perform the instructions in order to select a single template, complete the data fields by extracting information from one or more databases and transmit a completed payment file via the network gateway to a file exchange server of a payment facilitation system,
   wherein the selected template file contains a plurality of data fields and logic instructions configured to modify the plurality of data fields of the template file based on the particular beneficiary, and
   whereby the computer is configured to:
      modify the selected template file based on determining which data fields to dynamically select based on the request for the payment,
      determine which information to extract for the data fields, and formatting a data field according to the logic instructions and execute an executable file based on the logic instructions in the template file to extract information from a database to complete the data fields of the modified template file configured for the beneficiary, whereby a file exchange server of the payment facilitation computing system validates the payment file before dissemination.

17. The computer-implemented method according to claim 16, wherein the template file is provided by e-mail.

18. The computer-implemented method according to claim 16, wherein the template file is downloaded by a recipient.

19. The computer-implemented method according to claim 16, wherein a first template file is used for generating a credit payment file and a second template file is used for generating a debit payment file.

20. A computer system for generating a payment file by a remote payor computing system via retrieving a template file transmitted by a file exchange server of a payment facilitation computing system, the system comprising:
   a computing device local to the payor computing system, the computing device generating a payment request to a beneficiary;
   a plurality of template files transmitted by the file exchange server to a database local to the payor computing system, each template file comprising a plurality of data fields and logic instructions configured to cause a payor server to generate the payment file and to modify the plurality of data fields of the template file;
   the payor server coupled to the payor computing system, the payor server:
      receiving the payment request from the computing device local to the payor computing system, the payment request instructing the payor server to generate a payment file using at least one template file among the plurality of template files;

responsive to receiving the payment request, automatically identifying a template file that is associated with the beneficiary;

modifying the identified template file based on determining which data fields to dynamically select based on the payment request;

determining which information to extract for the included data fields;

formatting a data field based on the payment request according to the logic instructions;

executing an executable file based on the logic instructions in the identified template file to:

scan and extract information from the database to complete the data fields of the modified template file configured for the beneficiary; and generate and transmit, via a network of the payor computing system to the file exchange server, the payment file by completing the data fields of the modified template file according to the logic instructions configured based on the payment request, whereby the file exchange server validates the payment file before dissemination.

* * * * *